Dec. 29, 1942.   R. FINK ET AL   2,306,382
OXYGEN DISTRIBUTION SYSTEM AND REGULATOR THEREFOR
Filed Jan. 28, 1941   2 Sheets-Sheet 1
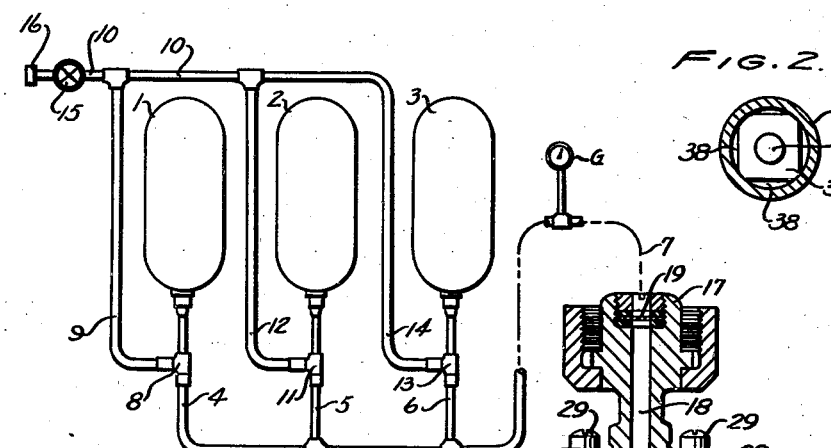
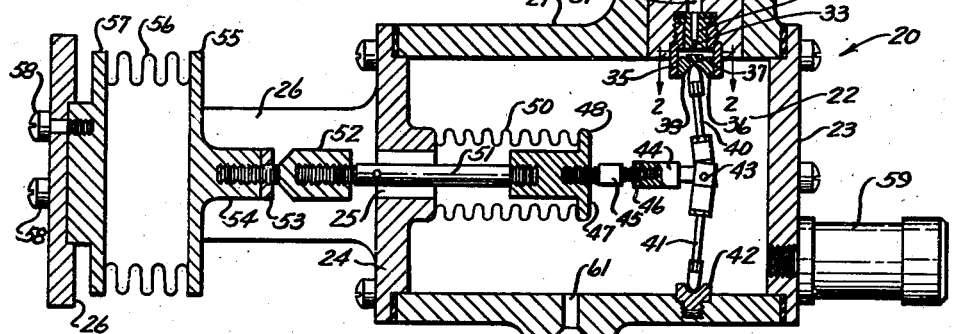
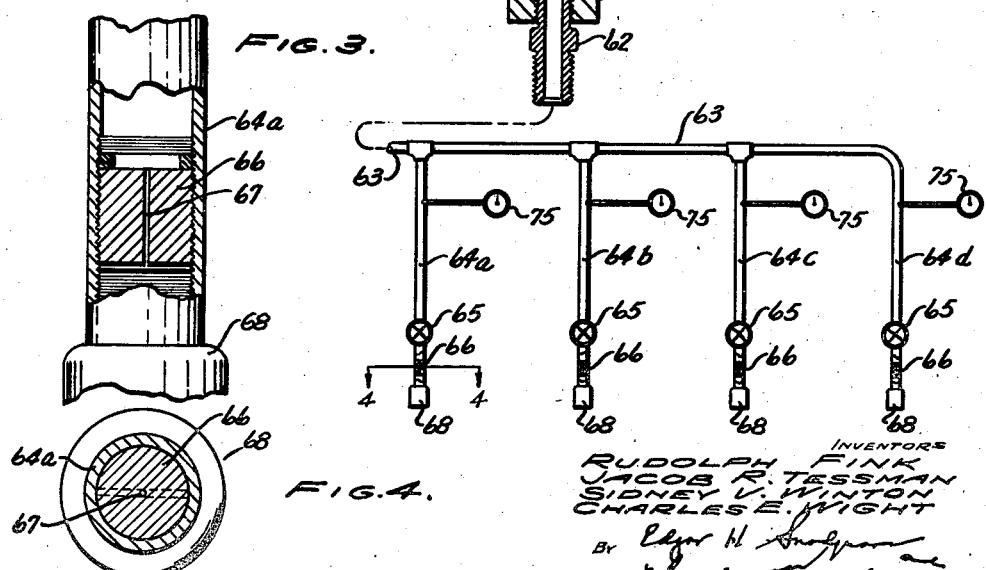

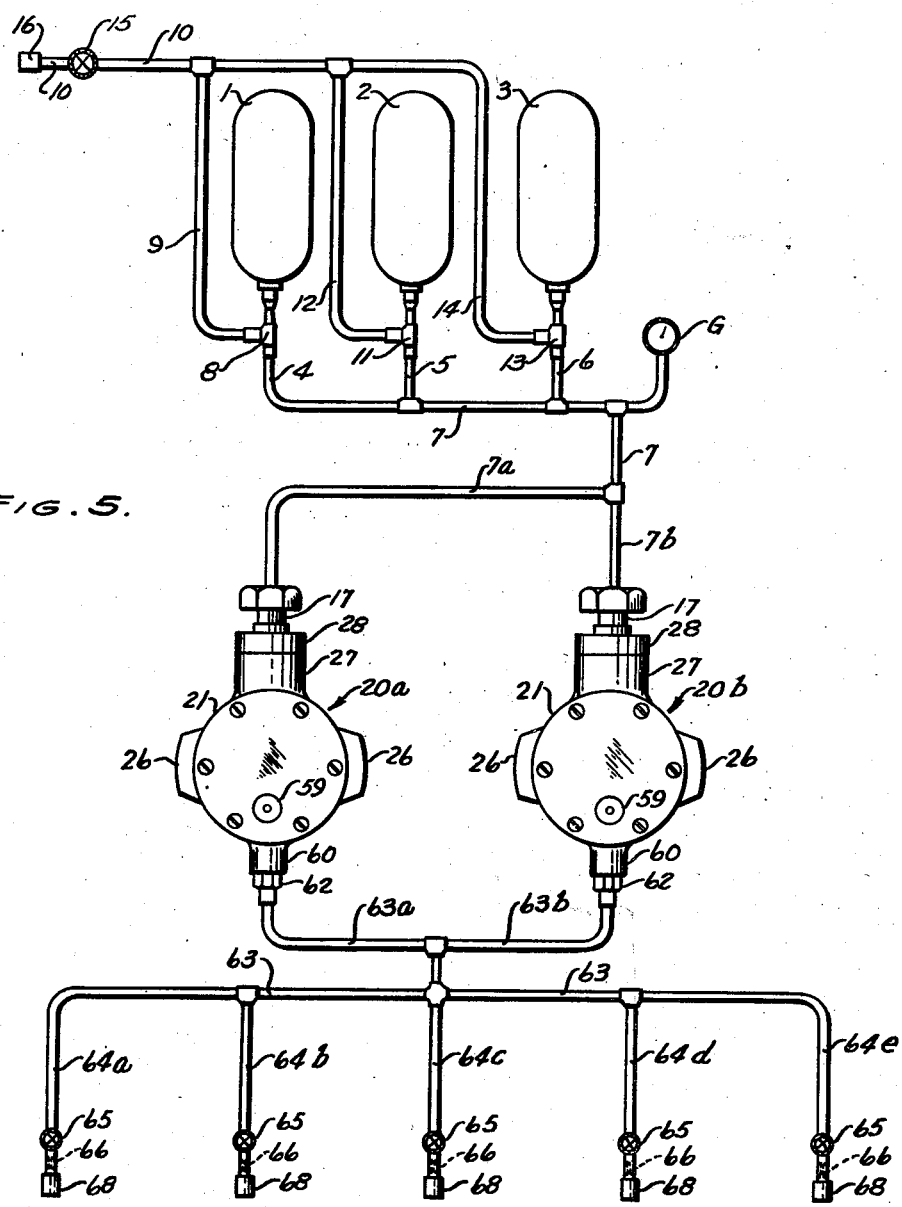

Patented Dec. 29, 1942

2,306,382

UNITED STATES PATENT OFFICE 2,306,382

OXYGEN DISTRIBUTION SYSTEM AND REGULATOR THEREFOR

Rudolph Fink, Dayton, Jacob R. Tessman and Sidney V. Winton, Yellow Springs, and Charles E. Wight, Dayton, Ohio Application January 28, 1941, Serial No. 376,326

7 Claims. (Cl. 128—204)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to means for regulating the flow of gas to distribution lines and more particularly relates to a device for controlling the supply of oxygen from a high pressure source to a plurality of consumer lines in an aircraft for consumption by the occupants of the aircraft in metered quantities dependent on the altitude of the flight.

Two principal means for controlling the flow of oxygen to one or more consumer lines in an aircraft have been employed in the prior art and a resume of the various prior art regulating systems is disclosed in N. A. C. A. Technical Report No. 130, part 4, entitled "Oxygen Instruments" published 1922. One means for controlling the oxygen supply comprised a pressure regulator which controlled the flow of oxygen from a high pressure cylinder to a chamber forming a manifold through the medium of one or more automatic pressure reducing valves such that the pressure in the chamber or manifold remained substantially constant for a given altitude and some devices were equipped with barometric pressure responsive means acting on the regulator valve controlling the flow of gas to the chamber such that the chamber pressure would be changed in accordance with change in altitude. The regulator controlling the chamber or manifold pressure operated to vary the size of the valve orifice connecting the chamber with the higher pressure source to maintain the pressure in the chamber at the desired value.

The second system for oxygen regulation was that employed in the Prouty-Van Sicklen device described on pages 9 and 10 of the above noted publication and which comprised a pair of automatic regulators or pressure reducing valves arranged in series to control the flow of oxygen from a high pressure source to a chamber connected to a consumer line, a calibrated orifice or flow restriction being placed in the line of flow of gas from the chamber to the consumer line. The second regulator controlling the flow of gas to the chamber or manifold was automatically operative to vary the chamber pressure to maintain a pressure difference across the fixed orifice such that constant metered flow of oxygen would be delivered to the consumer line for a particular altitude. The second regulator was also provided with a modifier responsive to barometric pressure so that the chamber pressure could be adjusted automatically to vary the metered quantity delivered to the consumer line in accordance with the requirements for different altitudes.

Each of the above systems have serious disadvantages when it is attempted to apply them to aircraft where multiple consumer lines must be supplied with oxygen. The first system has the disadvantage that if a plurality of consumer lines are connected in parallel to the manifold or chamber, different quantities of oxygen will be delivered to each consumer dependent on the length of the consumer lines and the breathing characteristics of the respective consumers. The second system suffers from the disadvantage that a different calibrated delivery orifice must be employed for each different total number of consumer lines and further has the disadvantage that when the consumer lines are connected in parallel beyond the calibrated fixed orifice the problem of obtaining a metered equal flow in each consumer line is still present similar to the difficulty present in the first system.

In order to obviate the difficulties encountered when supplying a plurality of oxygen consumer lines it is at present the practice to employ a separate automatic regulator for each consumer line which while satisfactory from an oxygen distribution standpoint, greatly increases the cost of the distribution system with a considerable increase in weight and necessary maintenance.

In accordance with the present invention, the difficulty of delivering a metered quantity of oxygen to a plurality of consumer lines is solved by connecting the high pressure source to an automatic pressure regulator having a barometric pressure responsive modifier for controlling the pressure of oxygen within a chamber or manifold sealed from the outside atmosphere and any desired number of consumer lines are connected to the chamber or manifold, a calibrated orifice or flow restriction being inserted in the line of flow from the chamber or manifold to each consumer line. The regulator is operative to maintain a pressure within the chamber so that the pressure difference across each delivery orifice will be sufficient to give a definite metered flow to each consumer line for a particular altitude while the pressure is varied in accordance with the outside atmospheric pressure to vary the metered flow to meet the requirements at different altitudes. With the device in accordance with the invention the chamber pressure will be the same irrespective of the number of consumer lines and hence one or any number of lines may be supplied with a metered quantity of oxygen dependent on altitude without it being necessary to adjust the regulator.

In the system in accordance with the invention the regulator itself embodies novel features of construction which make the same a simple and rugged device, this being accomplished by employing a metallic bellows for an aneroid to accomplish altitude adjustment of the regulating valve and also employing a similar bellows as a sealing means in conjunction with the aneroid, the inherent resilience of the bellows being utilized to resist the deformation of the aneroid under varying atmospheric pressures, thus eliminating the use of control springs.

The present invention also incorporates a novel safety feature in the provision of a pair of automatic regulators of the character described each connected in parallel to a high pressure oxygen source and to a common delivery manifold which in turn is connected through individual flow restricting orifices to consumer lines. The parallel connected regulators insure operation of the system even though one of the regulator valves becomes disabled and fails to function.

The principal object of the invention is the provision of an oxygen regulating system for aircraft and the like in which a regulator is connected to a source of oxygen at high pressure and controls the pressure of gas within a chamber or manifold, a plurality of consumer lines being connected to the chamber in parallel, with a flow restricting orifice being arranged in the line of flow of gas from the chamber to each respective consumer line, and the regulator incorporating barometric pressure responsive means to vary the chamber pressure in accordance with the ambient atmospheric pressure.

A further object of the invention is the provision in an oxygen distribution system of an automatic barometric pressure controlled regulator operative to supply metered quantities of oxygen to a plurality of consumer lines.

Another object of the invention is the provision in a regulator of the character described of a flow regulating valve for controlling the pressure of oxygen in a chamber, of resilient sealing means for sealing the chamber from the atmosphere, an aneroid operative to modify the adjustment of the valve including a control member passing through and connected to said sealing member, the inherent resilience of the aneroid and the sealing member being the sole means resisting deformation of the aneroid under varying atmospheric pressure.

Other objects of the invention not specifically described will become apparent by reference to the detailed description in the following specification in conjunction with the appended drawings in which:

Figure 1 is a view partly in section illustrating the novel oxygen distribution system in accordance with the invention.

Figure 2 is a sectional view taken on line 2—2 of Figure 1 illustrating a valve detail.

Figure 3 is an enlarged longitudinal sectional view of one of the calibrated flow restrictions or metering orifices employed in the device of Figure 1.

Figure 4 is a sectional view of the orifice illustrated in Figure 3 and taken on line 4—4 of Figure 1.

Figure 5 is a view illustrating a modified form of the oxygen distribution system of Figure 1 in which two automatic regulators are employed acting in parallel and provided as a safety measure.

Referring now to Figure 1, the reference numerals 1, 2 and 3 respectively indicate high pressure oxygen tanks or containers adapted to be mounted in any suitable location on an aircraft for supplying oxygen to the occupants of the aircraft when flying at high altitudes. The tanks are respectively connected by means of conduits 4, 5 and 6 to an outlet conduit 7 leading to the oxygen regulating device, hereinafter described, a suitable pressure gage G being connected to the conduit 7 at any suitable point for visual observation of the tank pressure. The conduit 4 is also connected by means of a check valve 8 and conduit 9 to filling conduit 10, and the conduits 5 and 6 leading from tanks 2 and 3 are respectively connected to the filling conduit 10 by means of check valves 11 and 13 and conduits 12 and 14 respectively. The filling conduit 10 is provided with a shut off valve 15 and a suitable coupling 16 which may be attached to a high pressure oxygen bottle for filling the respective containers 1, 2 and 3 at a pressure of approximately 1500 pounds per square inch, the check valves 8, 11 and 13 preventing the flow of oxygen to the conduits 4, 5 and 6 respectively during the filling operation and also operative to prevent the return flow of oxygen through the conduits 9, 12 and 14 respectively after the filling operation is complete and the conduit 10 is vented to the atmosphere through the valve 15 which may thereafter be closed. The conduit 7 terminates in a removable coupling member 17 which is provided with a central outlet passage 18 and a filter screen 19 to filter dirt or sediment from the oxygen fed to the regulating system. The coupling member 17 is adapted to be threaded into the body of an automatic regulator generally indicated by the reference numeral 20.

The oxygen regulator 20 comprises a cylindrical casing or housing 21 arranged to form a chamber 22 which is sealed from communication with the outside atmosphere. The housing 21 is closed at one end by means of a removable cover plate 23 suitably secured thereto by means of screws or the like, and having its other end closed by means of a removable cover plate 24 having a centrally disposed aperture 25 therein. The cover plate 24 also has integrally formed therewith a U shaped bracket 26 which serves as a supporting base for control mechanism hereinafter described. Adjacent one end, the housing 21 is provided with an enlarged boss 27 which is suitably bored to receive a sleeve member 28 which is secured to the boss by means of screws 29. The sleeve member 28 is provided with a centrally threaded bore 30 into which the coupling member 17 may be threaded, the bore 30 communicating with a central passage 31 which in turn communicates with a throttling port 33 centrally formed in a plug member 34 which is suitably clamped into an enlarged counterbore in the sleeve 28 by means of an annular threaded locking sleeve 35. The lower portion of the locking sleeve 35 also serves as a guide for a reciprocating valve member 36, the valve member being provided with a centrally disposed valve disk 37 made of a material such as hard rubber, or Bakelite, and adapted to cooperate with the throttling passage 33 to control the escape of oxygen therefrom. The valve member 36 is cut away along its sides allowing for the free escape of oxygen from the passage 33 to the spaces 38 formed between the valve member 36 and the guide portion of the sleeve 35 (see Figure 2). The valve disk 37 is thus operative upon reciprocation of the valve 36 to either cut off the flow of oxygen from the passage 33 to the chamber 22 or to regulate the flow to the chamber 22 in accordance with the clearance between the valve disk 37 and the lower or port edge of the passage 33. The valve member 36 is provided on its lower side with a conical depression 39 which serves as a seat for the pointed end of a toggle link 40. A similar toggle link 41 has a pointed end similarly seated in an adjustable abutment 42 threaded into the opposite wall of the casing member 21. The toggle links 40 and 41 are pivotally connected at their inner ends by means of a pin 43 to a link 44 which is threaded on to the outer end of an adjusting rod 45 the inner end of which is threaded into an enlarged head 47 and by rotation of the adjusting member 45 the pivotal point of the toggle links may be shifted along the axis of the casing 21, the adjusted position being maintained by a lock nut 46. The head member 47 is provided at its inner end with an enlarged flange 48 which serves as a closure for the inner end of a metal sealing bellows 50, being secured to the bellows by a sweated solder joint. The inner end of the bellows 50 is similarly secured to a boss on the cover member 24 and is arranged to be concentric with the longitudinal axis of the casing 21 and the aperture 25 in the cover member 24. A rod 51 has its inner end threaded into the outer end of the enlarged head 47 and has its outer end suitably threaded into an adjusting member 52. The outer end of the adjusting member 52 is provided with a threaded extension which is screwed into a boss 54 formed integral with the disk 55, the lock nut 53 serving to maintain the adjustable member 52 in its adjusted position. The disk 55 serves as a closure for the outer end of a metal bellows 56, being suitably soldered thereto. The other end of the bellows is soldered to a closure member 57 which is rigidly secured by means of screws 58 to the bracket 26 carried by the cover plate 24 of the housing 21. The disk member 55, metal bellows 56 and closure member 57 together form an aneroid capsule which is evacuated to a pressure of a few millimeters of mercury.

The chamber 22 of the casing 21 is provided with a pressure relief valve 59 of conventional construction which is adapted to relieve excessive pressures built up in the chamber 22 by venting the chamber to the atmosphere.

On its lower side, the chamber 21 is provided with an enlarged boss 60 which is provided with a central passage 61 communicating with the chamber 22 at its inner end and suitably counterbored and threaded adjacent its outer end to receive a coupling member 62 which is adapted to be connected to a conduit 63, the chamber 22, passage 61 and conduit 63 together forming a manifold. The conduit 63 has connected therewith in parallel a plurality of outlet or consumer lines 64a, 64b, 64c, and 64d respectively, each of which is provided with a shut off valve 65, a calibrated metering orifice 66, and a coupling member 68, the latter being adapted to be connected to suitable flexible conduits or hose lines (not shown) which lead to the oxygen masks of the occupants of the aircraft. Each of the conduits 64a, 64b, etc. is provided with a suitable flow indicating device 75 which may be of a character to indicate the conditions of flow in its associated conduit. As seen in Figures 3 and 4, the calibrated flow restriction 66 which serves as a metering orifice, is made in the form of an elongated metal plug screwed into the interior of an associated conduit, for example 64a, and provided with a centrally disposed capillary passage 67.

*Operation*

The operation of the device of Figure 1 is as follows: By suitable adjustment of the adjusting members 45 and 52, the initial position of the toggle links 40 and 41 may be determined such that the valve 36 will hold valve disk 37 into sealing engagement with the lower end of the passage 33 when the aircraft is below a predetermined altitude, since the barometric pressure exerted on the evacuated aneroid bellows 56 will tend to collapse the aneroid bellows in opposition to the inherent resilience of the aneroid bellows and the sealing bellows 50, the force of atmospheric pressure causing the closure member 55 and the linkage connecting the closure member to the toggle links 40 and 41 to move axially to the left from a position as seen in Figure 1. As the aircraft ascends, the force exerted by atmospheric pressure on the aneroid bellows 56 will decrease and due to the inherent resilience of the aneroid bellows and the sealing bellows 50, the linkage connecting the bellows to the toggle links will move axially towards the right as seen in Figure 1, allowing the valve member 36 to move downward to permit oxygen to flow through the throttling orifice 33 and passage 38 (Figure 2) into the chamber 22, the pressure in the chamber being balanced against the resilient forces exerted by the aneroid capsule 56 and the sealing bellows 50, which in turn are also opposed by the existing atmospheric pressure. At any given altitude corresponding to a definite atmospheric pressure, the pressure of the oxygen within the chamber 22 will act on the enlarged head 47 and sealing bellows 50 against the resilient force of the bellows and the atmospheric pressure exerted on the interior of the sealing bellows through the aperture 25 of the cover plate 24 and also against the force of the atmospheric pressure acting on the aneroid 56. If the pressure within the chamber 22 should increase above the amount required for balance, the increased pressure will tend to collapse the bellows 50 causing the valve control linkage 44, 45 to be moved axially toward the left as seen in Figure 1 causing a closing movement of the valve 36 thus tending to decrease the flow of oxygen into the chamber 22 with a consequent reduction in the chamber pressure, while the reverse action will take place when the chamber pressure falls below a predetermined value for the particular existing altitude. Thus the valve 36 is actuated in the same manner as an automatic differential pressure-responsive reducing valve for a constant ambient atmospheric pressure, the aneroid bellows or capsule being operative to alter the balance relation of the pressure within the chamber 22 to the outside atmospheric pressure as the altitude is changed, thus serving as a modifier for controlling the valve 36.

Oxygen delivered from the containers 1, 2 and 3 through the throttling orifice 33 past the valve disk 37 and through the passages 38 (Figure 2) to the chamber 22 and from the chamber may flow through passage 61 and coupling member 62 to the conduit 63 and to each of the parallel connected consumer lines 64a, 64b, etc. and if any of the valves 65 are opened, oxygen will flow through the capillary passage 67 of the flow restricting member 66 to the flexible consumer hose lines (not shown) connected to the coupling members 68. For a given diameter and length of the capillary passage 67, there exists a definite quantity flow relation dependent upon the pressure difference across the ends of the capillary passage 67, i. e. for a definite pressure difference between the chamber 22 and the outside atmosphere there will occur a constant metered flow of oxygen through the capillary passage 67. Irrespective of the number of consumer lines connected to the conduit 63, the same metered flow will occur through each of the lines for a given existing pressure in the chamber 22. Since it is necessary to increase the amount of oxygen supplied to the occupants of an aircraft as the altitude is increased, the aneroid capsule 56 is operative to continue to move the linkage connecting the aneroid to the toggle links 40 and 41 further towards the right as seen in Figure 1 as the altitude increases, causing a further opening movement of the valve 36 with an increased flow of oxygen and an increased gas pressure within the chamber 22, thus causing a greater pressure difference across the metering orifices 66 in the respective consumer lines 64a, 64b, etc., and thus causing a corresponding increase in the metered quantity delivered to the various consumers. It is thus seen that the problem of distributing the proper amount of oxygen to each occupant of an aircraft under the control of a single barometric pressure responsive regulator is accomplished by means of the structure in accordance with the invention, the provision of the metering orifices for each consumer line rendering the correct distribution possible as well as permitting either one or a number of consumer lines to be in operation without requiring any adjustment of the regulator, the respective lines being placed in or out of action by means of the respective valves 65.

The apparatus further has the feature that all control springs in the regulator have been eliminated by utilizing the inherent resilience of the aneroid bellows 56 and the sealing member 50 to replace the springs and their function; the material from which the metallic bellows 50 and 56 are constructed is of course so chosen that the proper resilience will be obtained.

The proper adjustment of the angular position of the toggle links 40 and 41 is roughly determined upon assembly by adjustment of the adjusting link 45, while the final setting of the link positions is determined by adjustment of the adjustable member 52 from the outside of the regulator chamber 21, and by this external adjusting means, it becomes possible to regulate the altitude at which oxygen flow will commence.

Referring now to Figure 5, there is shown a modified form of the oxygen distribution system illustrated in Figure 1 which differs therefrom only in that the inlet supply conduit 7 connected to the respective oxygen tanks 1, 2 and 3 in the same manner as in the device of Figure 1 is split into two parallel branches 7a and 7b, respectively, which in turn communicate with the regulators 20a and 20b, each identical in construction with the regulator 20 as illustrated in Figure 1. The outlets of the regulators 20a and 20b are also connected in parallel by means of the conduits 63a and 63b respectively to the distribution conduit or manifold 63 of the same type as illustrated in Figure 1 and which is adapted to supply in one or more consumer lines 64a, 64b, etc. connected in parallel to the conduit 63 and each equipped with a valve 65, metering orifice 66 and coupling member 68 in the same manner as in the device of Figure 1. The operation of the system of Figure 5 is identical in all respects with the operation of the device of Figure 1 with the exception that a proper control of the oxygen distribution can still be obtained even though one of the regulators 20a or 20b becomes disabled due to sticking of its control valve, the happening of which has frequently occurred. By employing two regulators connected in parallel, the possibility of an accidental failure of the oxygen regulating system is rendered more remote.

It is to be understood while only one stage of automatic pressure regulation has been illustrated in the drawings, that one or more stages of automatic pressure regulating may be employed in series with the barometric pressure-responsive regulator illustrated in the drawings; such plural stage regulation, being old in the art, has not been illustrated, in order to simplify the disclosure.

It is further to be understood that the respective consumer lines 64a, 64b, etc. may be directly connected in parallel to the chamber 22 in place of being connected to the conduit 63, the chamber 22 serving as a manifold in either instance.

Having now described our invention what we believe to be novel and wish to secure by Letters Patent is:

1. An oxygen distribution system for aircraft comprising a source of oxygen under high pressure, a chamber connected to said high pressure source, an atmospheric pressure responsive regulating valve adapted to control the flow of oxygen from said source to said chamber and to maintain a pressure within said chamber bearing a predetermined relation to the ambient atmospheric pressure, a delivery conduit connected to said chamber and a plurality of consumer conduits connected in parallel to said delivery conduit, each of said consumer conduits including a calibrated non-adjustable metering orifice, and said orifices being of substantially equal size, whereby a metered flow of oxygen will pass through each of said metering orifices to the respective consumers dependent upon the existing ambient atmospheric pressure.

2. The structure as claimed in claim 1, in which said regulating valve is operative to cut off the flow of oxygen from said source to said chamber at ambient atmospheric pressures exceeding a predetermined atmospheric pressure.

3. An oxygen distributing system comprising a source of oxygen under high pressure, a chamber, a conduit connecting said source and said chamber including a flow controlling valve, means for actuating said valve to maintain a predetermined pressure in said chamber for a constant atmospheric pressure exterior of said chamber, barometric pressure responsive means operatively connected to said valve actuating means to vary said predetermined pressure in accordance with a changing atmospheric pressure and a plurality of consumer conduits connected in parallel to said chamber, and a plurality of non-adjustable metering orifices each associated with a respective one of said consumer conduits and inserted in the line of flow of gas from said chamber to each of said consumer conduits, said metering orifices being of substantially equal size.

4. An oxygen distribution system comprising a source of oxygen under high pressure, a manifold, a plurality of outlets from said manifold each outlet having associated therewith a non-adjustable calibrated metering orifice, all of said orifices being of substantially equal size, a connection between said source and said manifold, a valve controlling the flow of gas from said source to said chamber and operative to vary the pressure within said chamber to maintain a constant metered flow through any one of the metering orifices associated with a respective manifold outlet and means associated with said valve for controlling the same to vary the pressure of gas within said manifold to thereby vary the metered flow through any one of said outlet orifices in a predetermined relation to the ambient atmospheric pressure.

5. An oxygen regulating system comprising a source of oxygen under high pressure, a regulator device connected to said source, said regulator including a chamber sealed from the atmosphere, a valve for controlling the flow of gas from said source to said chamber, a plurality of consumer conduits connected to said chamber in parallel each of said conduits having a flow restricting metering orifice associated therewith, means for actuating said control valve including a resilient element subject to the pressure of gas within said chamber on one side thereof and to the ambient atmospheric pressure on the other side thereof, and an aneroid capsule for modifying the motion of said valve actuating means in accordance with changes in the ambient atmospheric pressure.

6. A regulator for controlling the flow of gas comprising a casing defining a chamber, a high pressure inlet to said chamber including a throttling orifice and a valve for controlling the flow of gas to said chamber through said orifice, means for actuating said valve including a linkage extending through said casing, a resilient bellows forming an aneroid capsule subject to ambient atmospheric pressure operatively connected to said linkage, a resilient sealing means connected to said linkage and to said casing to seal the casing from the outside atmosphere, said resilient bellows and said resilient sealing means being the sole means for resiliently opposing the movement of said valve, and an outlet connected to said chamber.

7. The structure as claimed in claim 6 in which the outlet connected to said chamber includes a plurality of parallel connected consumer conduits each having a calibrated metering orifice therein to meter the flow of gas through each respective consumer conduit in an amount dependent upon the ambient atmospheric pressure.

RUDOLPH FINK.
JACOB R. TESSMAN.
SIDNEY V. WINTON.
CHARLES E. WIGHT.